May 19, 1970  J. C. J. BLOSSE ET AL  3,512,873
INVISIBLE SPYGLASS
Filed Dec. 15, 1966
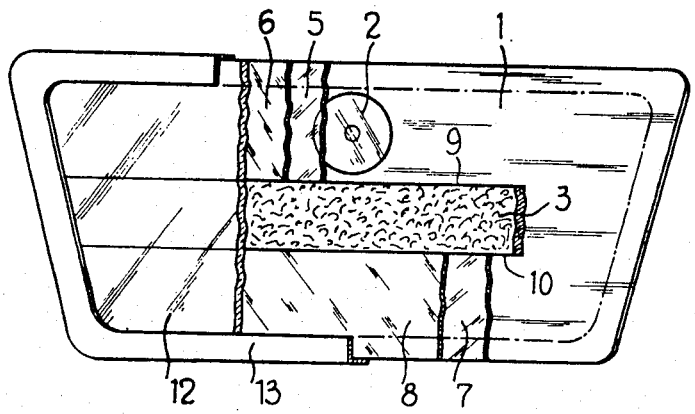

United States Patent Office 3,512,873
Patented May 19, 1970

3,512,873
INVISIBLE SPYGLASS
Jean Charles Joseph Blosse, and Michel Jean Joseph Blosse, both of 48 Boulevard du General de Gaulle, 95 Sannois, France
Filed Dec. 15, 1966, Ser. No. 602,065
Claims priority, application France, Dec. 21, 1965, 43,082; Dec. 7, 1966, 86,434
Int. Cl. G02b 5/20, 25/04
U.S. Cl. 350—196    12 Claims

ABSTRACT OF THE DISCLOSURE

Spyglass structure for doors, walls or the like, wherein the optical device constituting the spyglass is masked off from outside view by masking means allowing observation from the inside of the door or wall, said masking means comprising colored and transparent plates absorbing a high proportion of the light.

---

Many devices are known for rendering invisible spyglasses which afford a wide-field view from within a local of objects or persons situated outside the local.

Usually, these spyglasses are rendered invisible by placing on the outside in front of the optical device a semi-reflecting mirror glass allowing observation from the interior to the exterior whereas observation from the exterior to the interior is practically impossible.

The drawback of such an arrangement is that it requires the use of a semi-reflecting glass, whose manufacture is difficult and costly.

The object of the present invention is to provide an invisible optical spyglass which can be manufactured with simple means from cheap materials.

In the invisible optical spyglass according to the invention the optical device is mounted on a support plate of preferably opaque material and is masked off from outside view by masking means consisting of a colored transparent plate, said transparent plate being mounted on or in the support plate.

Thus in the spyglass according to the invention the optical device is rendered invisible by a high absorption of the light by the colored transparent masking means as opposed to conventional devices in which this result is achieved by reflection of the light.

In one embodiment of the invention the masking means consist of a sheet of plastics material. This sheet is preferably smoked.

In another embodiment of the invention, the masking means consists of a strip of glass, the glass being preferably smoked glass.

According to a modification, the masking means comprises a plurality of superimposed plates, the latter being preferably of different hues.

The portion of the surface of the support plate on which the plate or plates forming the masking means bear is colored, for example black if the eye-piece is black, so as to decrease the contrasts and render the colored transparent plate or plates practically invisible.

According to one embodiment, the support plate is divided into a plurality of portions, a first portion corresponding to the part comprising the spyglass covered by one or more plates, and uncovered intermediate portion and a last portion employed for decorative purposes and, if desired, covered by colored transparent plates, the number and color of which may be different from those of said first portion supporting the optical device.

The intermediate portion of the support plate can be covered by a flexible or rigid shreet which is preferably adhered thereto and constitutes a support for the edges of the colored transparent plates of the other portions.

The assembly i covered by a transparent preferably colorless pane which may be of plastics material and is held on the support by means of a border constituting a frame of suitable conventional type.

Further features and advantages of the invention will be apparent from the ensuing description with reference to the accompanying drawing in which the figure is an elevational view, partly in section, of one embodiment of the invisible spyglass according to the invention.

In the illustrated embodiment, the reference numeral 1 designates a support plate on which an optical viewing device or spyglass 2 is secured in any known or appropriate manner.

In the illustrated embodiment, this spyglass is located in the upper part of the support plate, although it will be understood that it can be located any where on this plate.

A strip 3 of felt, cardboard or other material having a certain thickness is secured by adhesion or other means to the middle part of the support plate 1.

Two plates 5 and 6 constituting masking means are located in the upper part above the strip 3. These plates can be sheets of colored transparent plastics material, the sheet 5 being for example yellow and the sheet 6 for example green. These plates 5 and 6 are superimposed and cover the whole of the upper part of the support plate and in particular the otical device 2. The plastics material can have any appropriate color and is preferably smoked so as to have a neutral black color.

The plates 5 and 6 can also be strips of colored, preferably smoked, glass.

In any case they are such that the light emanated by the optical device 2 towards the exterior is absorbed while light is allowed to pass from the exterior to the interior with a hue which is preferably neutral so that the objects viewed are untinted.

Located in the lower part of the plate, that is, below the strip 3 are also two superimposed plates 7 and 8 which can be of the same color and type as the plates 5 and 6 or of a different color. If desired, these plates can be of cardboard or like material.

The edges 9 and 10 of the strip 3 serve as bearing faces for the corresponding edges of the colored plates 5, 6, 7 and 8.

The assembly is covered by a transparent and preferably colorless plate 12 of plastics material which covers the whole of the surface of the plate 1 and is held in position by a ledge 13 which constitutes the frame of the assembly and holds all the transparent sheets in position.

By a selection of the material and of the colors of the plates 5 and 6 which cover the optical device 2, it is possible to achieve, without an excessive absorption of light, an excellent view from inside the local of the exterior and color and lighting effects which are pleasant to the eye.

The advantage of the device, in the case of plastics material, is the use of unbreakable sheets which are easy to cut out and place in position.

When smoked or colored strips of glass are employed, the latter are less liable to deteriorate than strips of plastics material which are not as hard as glass. This could be advantageous in the case of invisible spyglasses mounted on doors the closing of which necessarily transmits a shock to the system. The rubbing of the optical device against the adjacent plate can create scratching on plastics material which is avoided in the case of glass.

Further, the sight of the black or dark coloring of the masking means, thus rendered semiabsorbent, of the colored or smoked glass or of the smoked or colored transparent plastics material, gives a dark appearance to the assembly of the system which consequently attracts less attention than systems in which the optical device is masked by a semi-reflecting glass.

The lower part in the illustrated embodiment, which has colored plates 7 and 8, is restricted solely to decoration and does not concern the optical device so that light colors can be chosen and original visual effects obtained by placing, for example, a design between the plate 7 and the plate 8, a second design between the plate 7 and the plate 8 and even a third decorative design between the plate 8 and the cover plate 12 so that by means of appropriate cutting out a particular relief can be given to the various designs. This is so, for example, when it concerns giving information about the name, address, profession or any other professional or commercial information.

The intermediate strip 3, which is shown to be a horizontal strip, can be replaced by two vertical strips framing the optical device. A plate can be constructed having two free lateral zones for the decoration and a central zone for the viewing. Many further combinations can be employed, in particular those resulting from cutting out forming apertures in the masking means for decorative or practical purposes.

Having now described our invention what we claim as new and desire to secure by Letters Patent is:

1. Spyglass structure for doors, walls or the like, comprising a support plate, an optical device constituting a spyglass carried by said support plate, and masking means for masking off said optical device from outside view while allowing observation from the inside of the door or wall, said masking means comprising a plurality of differently colored superimposed homogeneous transparent sheet elements mounted on the support plate and being substantially greater in area than and completely covering the optical device, whereby said optical device is rendered substantially invisible owing to a high absorption of the light by said superimposed sheet elements.

2. Spyglass structure as claimed in claim 1, wherein at least one of said colored and transparent elements is of plastic material.

3. Spyglass structure as claimed in claim 2, wherein at least one of said elements is a smoked element of plastic material.

4. Spyglass structure as claimed in claim 1, wherein at lease one of said colored and transparent elements is a sheet of glass.

5. Spyglass structure as claimed in claim 4, wherein said glass is smoked glass.

6. Spyglass structure as claimed in claim 1, wherein the portion of said support plate which surrounds said optical device has the same color as said optical device so as to decrease the contrasts and render said colored and transparent element substantially invisible.

7. Spyglass structure as claimed in claim 6, wherein said optical device is black and said portion of said support plate is black.

8. Spyglass structure as claimed in claim 1, wherein said plate has a first portion in which said optical device is located and which is covered with said masking means, an intermediate portion which is not covered by said masking means, and a second portion for decorative purposes.

9. Spyglass structure as claimed in claim 8, further comprising a colored transparent element covering said second portion of said plate.

10. Spyglass structure as claimed in claim 9, further comprising a sheet of material secured to and covering said intermediate portion of said plate, said sheet having edges in abutting relation to edges of said colored transparent elements of said first and second portions of said plate.

11. Spyglass structure as claimed in claim 8, further comprising a plurality of colored transparent elements in superimposed relation to each other and covering said second portion of said plate.

12. Spyglass structure as claimed in claim 1, further comprising a pane of transparent material covering said masking means and a frame element securing said pane to said plate.

References Cited
UNITED STATES PATENTS 2,262,203   11/1941   Redstone et al.
2,994,150   8/1961   Navarre _____ 350—316 X JOHN K. CORBIN, Primary Examiner U.S. Cl. X.R.
350—316, 319